(12) United States Patent
Fielder et al.

(10) Patent No.: US 11,441,044 B2
(45) Date of Patent: Sep. 13, 2022

(54) PIGMENT-BASED INK FORMULATIONS HAVING IMPROVED PRINTHEAD LIFETIME

(71) Applicant: Memjet Technology Limited, Dublin (IE)

(72) Inventors: Simon Fielder, North Ryde (AU); Alison Chong, North Ryde (AU); David Tyvoll, North Ryde (AU); Tim Hudson, North Ryde (AU); Roger Davey, North Ryde (AU); Ellaine Munton, North Ryde (AU)

(73) Assignee: Memjet Technology Limited

( * ) Notice: Subject to any disclaimer, the term of this patent is extended or adjusted under 35 U.S.C. 154(b) by 588 days.

(21) Appl. No.: 16/549,570

(22) Filed: Aug. 23, 2019

(65) Prior Publication Data

US 2020/0062981 A1 Feb. 27, 2020

Related U.S. Application Data

(60) Provisional application No. 62/722,771, filed on Aug. 24, 2018.

(51) Int. Cl.
*C09D 11/38* (2014.01)
*B41J 2/14* (2006.01)
*C09D 11/322* (2014.01)

(52) U.S. Cl.
CPC ............. *C09D 11/38* (2013.01); *B41J 2/14* (2013.01); *C09D 11/322* (2013.01)

(58) Field of Classification Search
CPC ........ C09D 11/38; C09D 11/40; C09D 11/322; C09D 11/30; B41J 2/14; B41J 2/2107
See application file for complete search history.

(56) References Cited

U.S. PATENT DOCUMENTS

| 6,682,588 B2 | 1/2004 | Shioya et al. |
| 2012/0287207 A1* | 11/2012 | Fielder ............... B41J 2/14016 347/63 |
| 2016/0137861 A1* | 5/2016 | Tyvoll ..................... B41J 2/01 347/56 |

FOREIGN PATENT DOCUMENTS

| WO | WO-2008/130627 A1 | 10/2008 |
| WO | WO-2012/151630 A1 | 11/2012 |

OTHER PUBLICATIONS

International Search Report and Written Opinion of the International Searching Authority dated Oct. 30, 2019, for PCT Application No. PCT/EP2019/071275, filed on Aug. 8, 2019, 11 pages.

* cited by examiner

*Primary Examiner* — Jannelle M Lebron
(74) *Attorney, Agent, or Firm* — Cooley LLP

(57) ABSTRACT

An aqueous-based inkjet ink for a thermal inkjet printhead includes: a pigment; 2 to 90 ppm ammonium ions; and an ink vehicle. The ink has a pH in the range of 8 to 9.5 and exhibits improved lifetime in thermal inkjet printheads with minimal loss of print quality.

20 Claims, 2 Drawing Sheets

PIGMENT-BASED INK FORMULATIONS HAVING IMPROVED PRINTHEAD LIFETIME

CROSS-REFERENCE TO RELATED APPLICATIONS

The present application claims the benefit of priority under 35 U.S.C. § 119(e) of United States Provisional Application No. 62/722,771, entitled PIGMENT-BASED INK FORMULATIONS HAVING IMPROVED PRINTHEAD LIFETIME, filed Aug. 24, 2018, the contents of which are hereby incorporated by reference in their entirety for all purposes.

FIELD OF THE INVENTION

This invention relates to an inkjet ink. It has been developed primarily for improving the lifetime of printheads, particularly the Applicant's Memjet® printheads.

BACKGROUND OF THE INVENTION

The present Applicant has developed a plethora of high-speed inkjet printers employing stationary Memjet® printheads which extend across a media width. By contrast, most other types of inkjet printer utilize a scanning printhead which traverses across the media width.

High-speed pagewidth printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. Nos. 6,755,509; 7,246,886; 7,401,910; and 7,658,977, the contents of which are incorporated herein by reference) and those with embedded ("bonded") resistive heater elements (as described in, for example, U.S. Pat. Nos. 7,377,623; 7,431,431; US 2006/250453; U.S. Pat. Nos. 7,491,911; 9,044,945 and 9,573,368, the contents of which are incorporated herein by reference).

Nozzle devices having suspended heater elements offer the advantages of efficient heat transfer from the heater element to the ink and self-cooling characteristics. However, they suffer from the disadvantage of relatively short printhead lifetimes, because suspended heater elements are typically less robust than their bonded counterparts.

Nozzle devices having bonded heater elements offer the advantages of longer lifetimes and suitability for use with aggressive pigment-based inks. Pigment-based inks are desirable in terms of optical density and water-fastness, but require ink formulations with a high pH in order to prevent flocculation of the pigment suspension.

It is desirable to increase printhead lifetimes so as to minimize the frequency of printhead replacements and, thereby, reduce overall costs to users. One approach to improving printhead lifetime is to coat the heater element with one or more protective layers. For example, U.S. Pat. No. 9,573,368 (assigned to the present Applicant) describes bonded heater elements comprised of an alumnide alloy coated with a thin (e.g. 20 nm) layer of tantalum oxide. Relatively thin metal oxide coating layers are compatible with self-cooling operation and assist in inhibiting corrosion. However, a problem with relatively thin layers, such as those deposited via atomic layer deposition (ALD), is that the coating layer may be non-uniform with weak spots around the edges of the heater element. In particular, one observable failure mechanism is delamination of the heater element caused by breaching of the metal oxide coating layer at the edges of the heater element and subsequent corrosive undercutting of silicon oxide beneath the heater element. Corrosive attack on this silicon oxide pedestal underlying the heater elements results in delamination and, ultimately, failure of the nozzle device.

In the present context, "failure" of a nozzle device means a change in drop ejection characteristics which results in unacceptable print quality. For example, failure may be invoked by a reduction in drop velocity, poor drop directionality or non-ejection of ink.

As is known in the art, alkaline pigment-based inks are particularly aggressive towards MEMS structures in thermal inkjet printheads, especially silicon oxide structures. Corrosive attack by alkaline pigment-based inks occurs both under thermodynamic conditions and under accelerated conditions at elevated temperatures during droplet ejection.

U.S. Pat. No. 6,059,868 describes dye-based inks containing a precipitating agent (e.g. magnesium salt) and ammonium nitrate for reducing kogation caused by precipitating agent. The ammonium nitrate is present in an amount sufficient to cause 'microexplosions' on an inkjet heater element, thereby reducing kogation of the precipitating agent and increasing drop ejection velocities i.e. reduce 'decel'. The concentration of ammonium ions is in the range of 0.01 to 10 wt. %, preferably 0.2 to 3 wt. %, and preferably 0.1 to 1 wt. %.

It would be desirable to increase the lifetime of printheads which eject alkaline pigment-based inks.

SUMMARY OF THE INVENTION

In a first aspect, there is provided an aqueous-based inkjet ink for a thermal inkjet printhead comprising: a pigment; 2 to 90 ppm ammonium ions; and an ink vehicle, wherein the ink has a pH in the range of 8 to 9.5.

Inks according to the first aspect advantageously achieve improved printhead lifetimes in thermal inkjet printheads, whilst minimizing loss of print quality caused by heater kogation and decel. Advantageously, an amount of ammonium ions is minimized. Preferably, the ink contains 3 to 90 ppm, 4 to 80 ppm, 5 to 70 ppm, 5 to 60 ppm, 5 to 50 ppm, 5 to 40 or 5 to 30 ppm ammonium ions.

Preferably, the ammonium ions are present as one or more ammonium salts selected from the group consisting of: ammonium formate, ammonium acetate, ammonium nitrate, ammonium carbonate, ammonium hydrogen carbonate, ammonium hydroxide, ammonium hexafluorophosphate, ammonium carbamate, ammonium tetrafluoroborate, ammonium perchlorate, ammonium trifluoroacetate, ammonium trifluoromethanesulfonate, tri-ammonium phosphate, ammonium sulfide, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium oxalate, ammonium hydrogen oxalate, ammonium fluoride, ammonium chloride, ammonium bromide, ammonium iodide and ammonium sulfate.

More preferably, the ammonium salt is selected from the group consisting of: ammonium formate, ammonium acetate, ammonium nitrate, ammonium carbonate, ammonium hydrogen carbonate and ammonium hydroxide.

The ammonium salt is not particularly limited provided that the anion is relatively benign in the ink formulation. For example, ammonium formate is a preferred ammonium salt due to its low cost, high solubility in water and lack of insoluble organic by-products upon thermal decomposition. Ammonium nitrate is a preferred ammonium salt and also exhibits excellent properties in ink. On the other hand, ammonium halides such as ammonium chloride potentially introduce a new corrosive mechanism via chloride-catalysed oxidation and are therefore less preferred. Of course, ammonium ions associated with colorants such as sulfonated dyes are undesirable, because the anionic dye will affect the color gamut of the ink.

In a more general aspect, there is provided an aqueous-based inkjet ink for a thermal inkjet printer comprising:
  a pigment;
    0.1 to 10 mM (millimoles per liter) of a nitrogen-containing compound (preferably 0.1 to 5 mM or 0.2 to 3 mM of the nitrogen-containing compound); and
  an ink vehicle, wherein:
  the ink has a pH in the range of 8 to 9.5; and
  the nitrogen-containing compound has a $pK_a$ of 8.5 to 10 and a $d(pK_a)/dT$ of $-0.0025$ to $-0.040$.

Where reference is made to the $pK_a$ of a nitrogen-containing compound, by convention this refers to the $pK_a$ of its conjugate acid. For example, the $pK_a$ of ethanolamine refers to the $pK_a$ of the corresponding ethanolaminium ion Preferably, the nitrogen-containing compound is selected from the group consisting of: primary amino compounds and secondary amino compounds. For example, the nitrogen-containing compound may be selected from the group consisting of: 2-amino-2-methyl-1,3-propanediol (AMPD), 2-amino-2-methyl-1-propanol (AMP), ethanolamine and bis-tris propane. In other embodiments, the nitrogen-containing compound may be an ammonium salt, such as one or more of the ammonium salts described above in connection with the first aspect.

Preferably, the inks described herein further comprise from 0.1 to 10 ppm of a trivalent metal ion, such as $Al^{3+}$ or $Ga^{3+}$. For example, aluminum ions may be present as aluminium nitrate nonahydrate. Trivalent metal ions advantageously suppress thermodynamic corrosion of silicon oxide or silicon nitride chamber materials, thereby improving the installed life of printheads. It is therefore an advantage of the present invention that printhead lifetime, measured in terms of number of droplet ejections, and installed life, measured in terms of a length of time a printhead can be installed in a printer before replacement, are both improved.

Preferably, the ink vehicle comprises at least one anti-kogation additive for minimizing kogation of the pigment on a heater element. For example, the anti-kogation additive is selected from the group consisting of: 1 to 10 wt. % ethoxylated glycerol; 1 to 10 wt. % polyethylene glycol; 1 to 10 wt. % polyethylene glycol ethers; and 2 to 20 wt. % triethylene glycol. Preferably, the ink comprises higher order glycols (e.g. triethylene glycol, tetraethylene glycol etc.) and/or alkoxylated alcohols (e.g. ethoxylated glycerol). The Applicant's experiments have shown that higher order glycols are surprisingly efficacious in improving printhead lifetime and generally outperform inks comprising only lower order glycols. Without wishing to be bound by theory, it is believed that high order glycols assist in solubilizing pigment particles kogated on heater elements and thereby suppress an alternative non-corrosive failure mechanism of nozzle devices. Moreover, higher order glycols have relatively low toxicity and impart other useful properties to the ink, such as humectancy and anti-curl properties. The anti-curl properties of higher order glycols are described in, for example, U.S. Pat. No. 5,356,464. Mixtures of glycol compounds are, of course, contemplated within the scope of the present invention.

In a second aspect, there is provided a printing system comprising printhead comprising a plurality of inkjet nozzle devices, each nozzle device comprising: a nozzle chamber and a heater element disposed on a subjacent silicon oxide pedestal; and
  an aqueous-based inkjet ink as described above.

The printing system according to the second aspect advantageously improves printhead lifetime as described above.

Typically, the heater element has a protective coating comprising at least one metal oxide layer, such as tantalum oxide and/or hafnium oxide. Inkjet nozzle device having heater elements comprising a metal oxide coating are described in U.S. Pat. No. 9,573,368, the contents of which are incorporated herein by reference. It is an advantage of the present invention that the ammonium ions suppress corrosion of the metal oxide coating by lowering pH in the immediate vicinity of the heater element during actuation.

Preferably, the protective coating has a thickness in the range of 5 to 50 nm and the heater element is comprised of an alumnide alloy, such as TiAl or TiAlNbW, as described in U.S. Pat. No. 9,573,368.

In a third aspect, there is provided a method of printing from a thermal inkjet printhead, the printhead comprising a plurality of inkjet nozzle devices, each nozzle device comprising a nozzle chamber and a heater element disposed on a subjacent silicon oxide pedestal, the method comprising the steps of:
  supplying an aqueous-based inkjet ink from an ink reservoir to the nozzle chamber; and
  actuating the heater element so as to eject ink droplets from the nozzle chamber, wherein the ink is as described above.

In accordance with the method according to the third aspect, a pH of ink contained in the ink reservoir is higher than a pH of ink contained in the nozzle chamber during actuation of the heater element. The relatively lower pH of ink contained in the nozzle chamber is by virtue of the release of protons from ammonium ions (or aminium ions) during heating, as described in more detail hereinbelow.

In a fourth aspect, there is provided an ink set for an inkjet printer having one or more printheads, each ink in the ink set having an associated printhead lifetime, wherein: a first ink is as described above; and a second ink contains a second pigment and a lower amount of ammonium ions (or nitrogen-containing compound) than the first ink, and wherein the first and second inks each have an associated printhead lifetime of greater than a minimum threshold number of ejections.

It is an advantage of the fourth aspect that inks in an ink set may be 'tuned' so that each ink achieves a predetermined minimum number of ejections in the printhead. For example, in the absence of any ammonium ions, a first ink may achieve 3 billion ejections while a second ink may achieve 5 billion ejections. If a printhead is rated for 4 billion ejections, then ammonium ions are added to the first ink in sufficient quantity to increase the number of ejections from 3 billion to 4 billion. Preferably, a minimum amount of ammonium ions (or nitrogen-containing compound) is added so as to have minimal impact on print quality. In this way, the ink set can be 'tuned' so that relatively shorter lifetime ink(s) are brought up to a similar lifetime as relatively longer lifetime ink(s).

In some embodiments, the second ink is absent any ammonium ions.

Typically, the minimum threshold number of ejections is in the range of 1 to 8 billion or 2 to 8 billion (e.g. 4 billion).

In a fifth aspect, there is provided an aqueous-based inkjet ink for a thermal inkjet printhead comprising:
   0.1 to 10 mM of a nitrogen-containing compound; and
   an ink vehicle,
   wherein:
   the ink has a pH in the range of 8 to 9.5; and
   the nitrogen-containing compound has a pKa of 8.5 to 10 and a d(pKa)/dT of −0.0025 to −0.040.

Preferably, the nitrogen-containing compound is selected from the group consisting of: ammonium salts, primary amino compounds and secondary amino compounds.

Preferably, the nitrogen-containing compound is selected from the group consisting of: ammonium salts, 2-amino-2-methyl-1,3-propanediol (AMPD), 2-amino-2-methyl-1-propanol (AMP), ethanolamine and bis-tris propane.

Preferably, the ink comprises from 0.1 to 10 ppm of a trivalent metal ion (e.g. $Al^{3+}$ or $Ga^{3+}$).

Preferably, the ink vehicle comprises at least one anti-kogation additive for minimizing kogation of the pigment.

Preferably, the anti-kogation additive is selected from the group consisting of: 1 to 10 wt. % ethoxylated glycerol; 1 to 10 wt. % polyethylene glycol; 1 to 10 wt. % polyethylene glycol ethers; and 2 to 20 wt. % triethylene glycol.

Preferably, the nitrogen-containing compound is present in a concentration ranging from 1 to 5 mM (millimoles per liter).

In a sixth aspect, there is provided an inkjet printing system comprising:
   a printhead comprising a plurality of inkjet nozzle devices, each nozzle device comprising: a nozzle chamber and a heater element disposed on a subjacent silicon oxide pedestal; and
   an aqueous-based inkjet ink contained in the nozzle chamber, the inkjet ink comprising a pigment; 0.1 to 10 mM of a nitrogen-containing compound; and an ink vehicle,
   wherein:
   the ink has a pH in the range of 8 to 9.5; and
   the nitrogen-containing compound has a pKa of 8.5 to 10 and a d(pKa)/dT of −0.0025 to −0.040.

Preferably, the heater element has a protective coating comprising at least one metal oxide layer.

Preferably, the protective coating has a thickness in the range of 5 to 50 nm.

Preferably, the protective coating comprises a layer of tantalum oxide.

Preferably, the heater element is comprised of an alumnide alloy.

Preferably, the nozzle chamber is comprised of silicon oxide.

In a seventh aspect, there is provided a method of printing from a thermal inkjet printhead, said printhead comprising a plurality of inkjet nozzle devices, each nozzle device comprising a nozzle chamber and a heater element disposed on a subjacent silicon oxide pedestal, said method comprising the steps of:
   supplying an aqueous-based inkjet ink from an ink reservoir to the nozzle chamber; and
   actuating the heater element so as to eject ink droplets from the nozzle chamber,
   wherein the ink comprises a pigment; 0.1 to 10 mM of a nitrogen-containing compound; and an ink vehicle, and wherein:
   the ink has a pH in the range of 8 to 9.5; and
   the nitrogen-containing compound has a pKa of 8.5 to 10 and a d(pKa)/dT of −0.0025 to −0.040.

Preferably, a pH of ink contained in the ink reservoir is higher than a pH of ink contained in the nozzle chamber during actuation of the heater element.

In an eighth aspect, there is provided an ink set for an inkjet printer having one or more printheads, each ink in the ink set having an associated printhead lifetime, wherein: a first ink contains a first pigment and 0.1 to 10 mM of a nitrogen-containing compound; and a second ink contains a second pigment and a lower amount of the nitrogen-containing compound than the first ink,
   wherein:
   the first and second inks each have a pH in the range of 8 to 9.5; and
   the nitrogen-containing compound has a pKa of 8.5 to 10 and a d(pKa)/dT of −0.0025 to −0.040; and
   the first and second inks each have an associated printhead lifetime of greater than a minimum threshold number of ejections.

In some embodiments, the second ink is absent the nitrogen-containing compound.

Typically, the minimum threshold number of ejections is in the range of 2 to 8 billion.

Typically, the first ink, when absent the nitrogen-containing compound, has an associated printhead lifetime of less than the minimum threshold number of ejections.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids and the like. Where reference is made to fluids or printing fluids, this is not intended to limit the meaning of "ink" herein.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
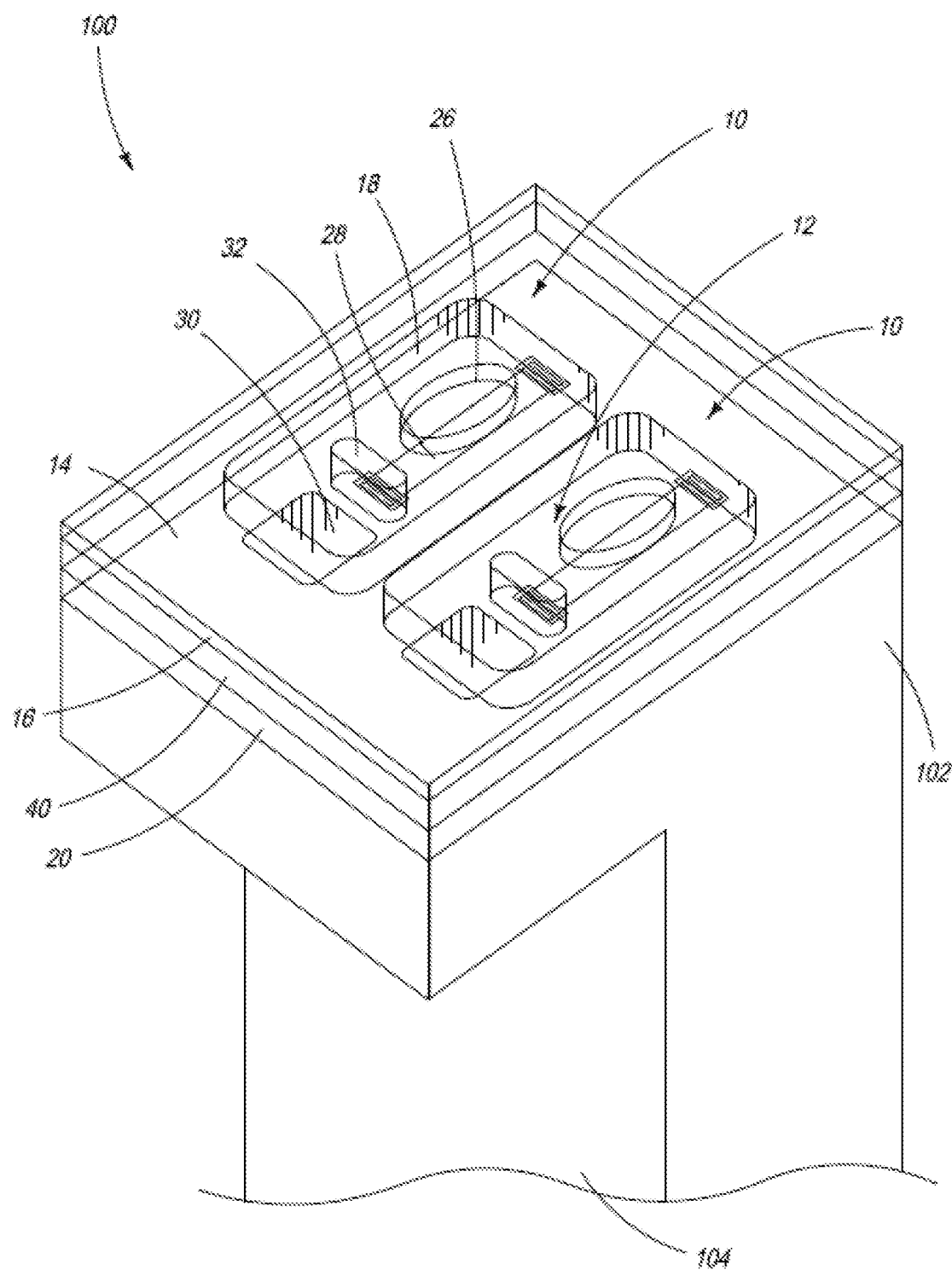
FIG. 1 is a cutaway perspective of part of an inkjet printhead chip comprising thermal inkjet nozzle devices.

The present inventors have sought a solution to the problem of improving printhead lifetime by investigating the effect of localized pH changes in the vicinity of the heater element during droplet ejection. Since accelerated corrosion of metal oxides occurs at high pH and high temperature, it was hypothesized by the present inventors that lowering the pH in the vicinity of the heater element would inhibit such corrosion. Of course, simply formulating low pH inks is not viable with alkaline pigment dispersions, because the anionic pigment dispersions (or anionic surface-modified pigments) would simply flocculate upon protonation. Therefore, the present inventors took the innovative approach of investigating certain additives which have a lower $pK_a$ when heated. Ideally, the additive should be a compound which exists mostly in its conjugate acid form at the ink pH at room temperature and mostly in its dissociated form to liberate protons at elevated temperatures during droplet ejection. Thus, a localized pH in the vicinity of the heater element during droplet ejection will be lower than a bulk pH of the ink and, hence, metal oxide structures susceptible to accelerated corrosion under alkaline conditions will be protected by the relatively lower localized pH.

Since pigment-based inks typically have a pH in the range of 8.0 to 9.5, it is first necessary to identify compounds having a $pK_a$ at or slightly above the ink pH so that the compound is present in the ink mostly in in its conjugate acid form and therefore has protons available for lowering the pH when required. Secondly, it is necessary to identify compounds having a relatively large negative $d(pK_a)/dT$, such that heating shifts the acid-base equilibrium towards release of protons. In practice, relatively few compounds meet these two requirements. For example, boric acid is a well-known ink additive having a suitable $pK_a$ of 9.2, but a $d(pK_a)/dT$ of $-0.008$, which is insufficient to liberate sufficient protons when heated. On the other hand, diglycine has a relatively large negative $d(pK_a)/dT$ of $-0.026$, but a $pK_a$ of 8.2 meaning that is exists mostly in its dissociated form at a typical ink pH and does not have a sufficient reserve of protons available to be liberated when heated.

After investigating a plethora of possible ink additives, ammonium ions having a pKa of 9.25 and a d(pKa)/dT of $-0.031$ were found to be the most effective in improving printhead lifetimes. Moreover, ammonium ions are cost-effective and safe for use in inkjet inks.

A further important consideration in improving heater lifetime is kogation of the heater element. If heater elements become kogated with pigments or other organic materials, then there is a loss of drop directionality and/or drop velocity—a phenomenon known in the art as 'decel'.

Whilst localized lowering of pH in the vicinity of the heater element may assist in inhibiting corrosion, if this localized pH is too low then flocculation of the pigment will be accelerated and the nozzle device may fail due to a kogative as opposed to a corrosive mechanism. Therefore, a balance of ink characteristics via mitigation of both corrosion and kogation is key to improving overall printhead lifetimes. Typically, kogation is mitigated by adding an amount of ammonium ions sufficient to improve lifetime but insufficient to cause significant loss of print quality via heater kogation. It is a surprising feature of the present invention that only very small amounts of ammonium ions (e.g. 10 to 80 ppm) are required to significantly improve printhead lifetime. At such low concentrations, there is an optimum balance between lowering pH at high temperature (thereby mitigating metal oxide attack) and minimizing kogation/decel.

Additionally, inks may be formulated with pigment-solubilizing anti-kogative components, such as triethylene glycol and/or ethoxylated glycerol (e.g. Liponic® EG-1, available from Vantage Specialty Ingredients, Inc.). With the addition of anti-kogation additives, further improvements in print quality are observed.

Colorant

The inks utilized in the present invention are usually aqueous pigment-based inks. Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions)

The pigments may be self-dispersing pigments, such as surface-modified pigments. The surface modification may be via either an anionic group or direct modification of the pigment surface. Typical surface-modifying groups are carboxylate and sulfonate groups.

Specific examples of suitable aqueous surface-modified pigment dispersions are Sensijet® Black SDP-2000, SDP-1000 and SDP-100 (available from Sensient Colors Inc.) and CAB-O-JET® 200, 300, 250C, 260M and 270Y (available from Cabot Corporation).

Alternatively, the pigments may be conventional pigment dispersions, which include a polymeric dispersant for encapsulating unmodified pigment particles. Examples of suitable pigment dispersions and their preparation are described in, for example, U.S. Pat. No. 9,834,694, the contents of which are incorporated herein by reference.

As known in the art, pigment-based inks are generally self-buffering due to the large number of carboxylate groups either on the surface of the pigment (in the case of surface-modified pigments) or in the polymeric dispersant. Therefore, pigment-based inks typically do not contain any additional buffering agents, in contrast with dye-based inks.

The average particle size of pigment particles in inkjet inks is optionally in the range of 50 to 500 nm.

Pigments may be used individually or in combination with other pigments and dyes. For example, the ink vehicle may comprise tinting dyes as is known in the art.

Ink Vehicle

The ink vehicles used in the present invention are typically conventional aqueous ink vehicles comprising at least 40 wt % water, at least 50 wt % water or at least 60 wt % water. Usually, the amount of water present in the inkjet ink is in the range of 40 wt % to 90 wt %, or optionally in the range of 50 wt % to 70 wt %.

Inks according to the present invention may further comprise co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include C1-4 alkyl alcohols, such as ethanol, methanol, butanol, propanol, and 2-propanol; alkylene glycols, such as ethylene glycol, diethylene glycol, triethylene glycol and tetraethylene glycol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, □-caprolactam, dimethyl sulfoxide, morpholine, N-ethylmorpholine, 1,3-dimethyl-2-imidazolidinone, urea and combinations thereof.

The inkjet ink may contain another high-boiling water-soluble organic solvent as a co-solvent, which can serve as a wetting agent or humectant for imparting water retentivity and wetting properties to the ink composition. Examples of high-boiling water-soluble organic solvents are 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the total amount of co-solvent present in the ink is in the range of about 5 wt % to 60 wt %, or optionally 10 wt % to 50 wt %.

The inkjet ink typically contains one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, □-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are di(C6-30 alkyl) sulfosuccinate sodium salt, sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N-(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc.).

Nonionic thioether surfactants, such as those described in U.S. Pat. No. 7,341,985, may be used in the ink vehicle. A specific example of a nonionic thioether surfactant is Dynol™ 360, available from Air Products and Chemicals, Inc.

Rake-type alkoxylated silicone surfactants may also be used in the ink vehicle. Specific examples of rake-type ethoxylated silicone surfactants are BYK-345, BYK-346 and BYK-349 (manufactured by BYK Japan K.K.), as well as Silface™ SAG-002, SAG-005, SAG-008, SAG-KB and SAG-503A (manufactured by Nissin Chemical Industry Co. Ltd.).

The surfactant(s) are typically present in the aqueous inkjet ink in an amount ranging from 0.05 wt. % to 2 wt % or 0.1 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

Inkjet Printheads

The inks according to the present invention are primarily for use in connection with thermal inkjet printheads. An exemplary type of thermal inkjet printhead is described in, for example, U.S. Pat. Nos. 9,950,527, 9,283,756 and 9,994,017, the contents of each of which are incorporated herein by reference. By way of completeness, an exemplary thermal inkjet printhead is described below.

Figure 2:
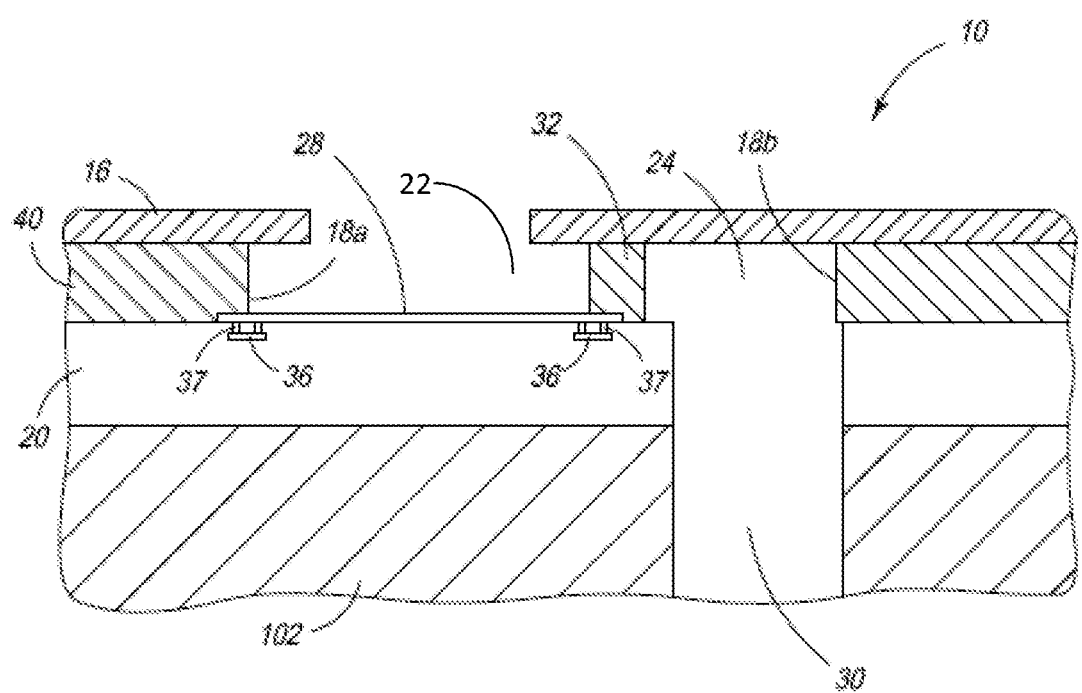
FIG. 2 is a sectional side view of one of the thermal inkjet nozzle devices shown in FIG. 1.

Referring to FIGS. 1 and 2, there is shown the inkjet nozzle device 10 comprising a main chamber 12 having a floor 14, a roof 16 and a perimeter wall 18 extending between the floor and the roof. FIG. 1 shows a CMOS layer 20, which may comprise a plurality of metal layers interspersed with interlayer dielectric (ILD) layers.

In FIG. 1 the roof 16 is shown as a transparent layer so as to reveal details of each nozzle device 10. Typically, the roof 16 and perimeter walls 18 are comprised of a ceramic material, such as silicon dioxide or silicon nitride.

The main chamber 12 of the nozzle device 10 comprises a firing chamber 22 and an antechamber 24. The firing chamber 22 comprises a nozzle aperture 26 defined in the roof 16 and an actuator in the form of a resistive heater element 28 bonded to the floor 14. The antechamber 24 comprises a main chamber inlet 30 (or "floor inlet 30") defined in the floor 14. The main chamber inlet 30 meets and partially overlaps with an endwall 18B of the antechamber 24. This arrangement optimizes the capillarity of the antechamber 24, thereby encouraging priming and optimizing chamber refill rates.

A baffle plate 32 partitions the main chamber 12 so as to define the firing chamber 22 and the antechamber 24. The baffle plate 32 extends between the floor 14 and the roof 16.

The antechamber 24 fluidically communicates with the firing chamber 22 via a pair of firing chamber entrances 34 which flank the baffle plate 32 on either side thereof. Each firing chamber entrance 34 is defined by a gap extending between a respective side edge of the baffle plate 32 and the perimeter wall 18.

The nozzle aperture 26 is elongate and takes the form of an ellipse having a major axis aligned with a central longitudinal axis of the heater element.

As best shown in FIG. 2, the heater element 28 is connected at each end thereof to respective electrodes 36 exposed through the floor 14 of the main chamber 12 by one or more vias 37. Typically, the electrodes 36 are defined by an upper metal layer of the CMOS layer 20. The heater element 28 may be comprised of, for example, a titanium-aluminium alloy, such TiAlNbW. In one embodiment, the heater element 28 may be coated with one or more protective layers, such as tantalum oxide and other metal oxides.

The vias 37 may be filled with any suitable conductive material (e.g. copper, tungsten etc.) to provide electrical connection between the heater element 28 and the electrodes 36. A suitable process for forming electrode connections from the heater element 28 to the electrodes 36 is described in U.S. Pat. No. 8,453,329, the contents of which are incorporated herein by reference.

Part of each electrode 36 may be positioned directly beneath an end wall 18A and baffle plate 32 respectively. This arrangement advantageously improves the overall symmetry of the device 10, as well as minimizing the risk of the heater element 28 delaminating from the floor 14.

A printhead chip 100 may be comprised of a plurality of inkjet nozzle devices 10, although the partial cutaway view of the printhead chip 100 in FIG. 1 shows only two inkjet nozzle devices 10 for clarity. The printhead chip 100 is defined by a printhead substrate 102 having the passivated CMOS layer 20 and a MEMS layer containing the inkjet nozzle devices 10. As shown in FIG. 1, each main chamber inlet 30 meets with an ink supply channel 104 defined in a backside of the printhead chip 100. The ink supply channel 104 is generally much wider than the main chamber inlets 30 and provides a bulk supply of ink for hydrating each main chamber 12 in fluid communication therewith. Each ink supply channel 104 extends parallel with one or more rows of nozzle devices 10 disposed at a frontside of the printhead chip 100. Typically, each ink supply channel 104 supplies ink to a pair of nozzle rows (only one row shown in FIG. 1 for clarity), in accordance with the arrangement shown in FIG. 21B of U.S. 7,441,865, the contents of which are incorporated herein by reference.

Experimental Section

Printhead Lifetime Testing

Accelerated printhead lifetime tests were conducted using Memjet® printhead integrated circuits (PHICs) mounted individually for operation in a modified printing rig. Each inkjet nozzle device of the PHIC comprised a tantalum oxide-coated resistive heater element disposed on a subjacent silicon oxide pedestal.

Method A: Test patterns were printed periodically and visually inspected to determine the health of the devices. Once the print quality had fallen below a predetermined threshold, the PHIC was deemed to have reached the end of its lifetime and the test was stopped. The number of ejections at the time of printhead failure was recorded to indicate printhead lifetime.

Method B: Ejected drop volumes were measured as an average of the total ink mass consumed over a given number of ejections. Failure of the PHIC was judged on the basis of a calculated number of failed nozzle devices. A PHIC was deemed to fail when 10 of 256 nozzle devices had failed. The number of ejections at the time of printhead failure was recorded to indicate printhead lifetime.

Thin Line Misdirection (TLM) Analysis

Thin lines of dots (3 m in length) having widths of 1-dot and 4-dots were printed on a web of print media. The thin lines were visually judged for misdirected droplets at either side of the line. The printouts were given a TLM grading from 0 (worst) to 10 (best). Qualitatively, a TLM grading of 7-10 was deemed to have excellent print quality acceptable for all applications; a TLM grading of 5-6 was deemed to have satisfactory print quality acceptable for most but not all applications; and a TLM grading of 0-4 was deemed to have low print quality unacceptable for most applications.

Results & Discussion

Initially, a range of buffer additives were investigated for their effect on printhead lifetime.

Yellows inks were formulated as described in Table 1 and adjusted to about pH 9.2 with sodium hydroxide. All inks were filtered (0.2 microns) prior to use and each ink contained 1 ppm gallium ions present as gallium nitrate nonahydrate. Buffer additive concentrations were 5 mM for all inks in Table 1.

TABLE 1

Yellow ink formulations

| | Ink 1 | Ink 2 | Ink 3 | Ink 4 | Ink 5 | Ink 6 | Ink 7 | Ink 8 | Ink 9 |
|---|---|---|---|---|---|---|---|---|---|
| Ethylene glycol | 9.5 | 9.5 | 9.5 | 9.5 | 9.5 | 9.5 | 9.5 | 9.5 | 9.5 |
| Liponic ® EG-1[a] | 5.0 | 5.0 | 5.0 | 5.0 | 5.0 | 5.0 | 5.0 | 5.0 | 5.0 |
| Yellow pigment | 4.0 | 4.0 | 4.0 | 4.0 | 4.0 | 4.0 | 4.0 | 4.0 | 4.0 |
| Emulgen™ 120[b]/Surfynol® 104[c] (2:1) | 1.25 | 1.25 | 1.25 | 1.25 | 1.25 | 1.25 | 1.25 | 1.25 | 1.25 |
| Silface™ SAG-002[d] | 0.05 | 0.05 | 0.05 | 0.05 | 0.05 | 0.05 | 0.05 | 0.05 | 0.05 |
| Boric acid | | 0.03 | | | | | | | |
| Bis-tris propane[e] | | | 0.14 | | | | | | |
| AMPD[f] | | | | 0.05 | | | | | |
| MES[g] | | | | | 0.10 | | | | |
| MOPS[h] | | | | | | 0.10 | | | |
| EPPS[i] | | | | | | | 0.13 | | |
| TAPS[j] | | | | | | | | 0.12 | |
| Glycylglycine | | | | | | | | | 0.07 |
| Water | balance | balance | balance | balance | balance | balance | balance | balance | balance |

[a]Liponic ® EG-1 is an ethoxylated glyercol (26 molar equivalent of ethoxylate), available from Lipo Chemicals
[b]Emulgen™ 120 is polyoxyethylene lauryl ether, available from Kao Corporation.
[c]Surfynol ® 104 is a nonionic acetylenic surfactant, available from Nissin Chemical Industry Co., Ltd.
[d]Silface™ SAG-002 is a rake-type mono-alkoxylated silicone surfactant, available from Nissin Chemical Industry Co., Ltd.
[e]Bis-tris propane is 1,3-bis(tris(hydroxymethyl)methylamino)propane
[f]AMPD is 2-amino-2-methyl-1,3-propanediol
[g]MES is 2-(N-morpholino)ethanesulfonic acid
[h]MOPS is (3-(N-morpholino)propanesulfonic acid)
[i]EPPS is 3-[4-(2-Hydroxyethyl)piperazin-1-yl]propane-1-sulfonic acid
[j]TAPS is tris(hydroxymethyl)methylamino]propanesulfonic acid The yellow ink formulations (Inks 1-9) shown in Table 1 were tested for printhead lifetime using Method A described above, and the number of droplet ejections (reported as millions of ejections) before printhead failure was determined. The results from these printhead lifetime tests are shown in Table 2.

TABLE 2

Printhead lifetime testing for yellow inks

| Tested Ink | Additive | Additive Concentration | $pK_a$ | $d(pK_a)/dT$ | Printhead Lifetime (Method A) |
|---|---|---|---|---|---|
| Ink 1 | None | 0 | | | 600 |
| Ink 2 | Boric acid | 5 mM | 9.24 | −0.008 | 500 |
| Ink 3 | Bis-tris propane | 5 mM | 9.0 | −0.030 | >1000 |
| Ink 4 | AMPD | 5 mM | 8.80 | −0.029 | >1000 |
| Ink 5 | MES | 5 mM | 6.10 | −0.008 | 600 |
| Ink 6 | MOPS | 5 mM | 7.14 | −0.011 | 900 |
| Ink 7 | EPPS | 5 mM | 7.85 | −0.015 | 700 |
| Ink 8 | TAPS | 5 mM | 8.40 | −0.024 | 600 |
| Ink 9 | Glycylglycine | 5 mM | 8.25 | −0.025 | 800 |

From these initial results, bis-tris propane and AMPD were identified as the most promising candidates for increasing printhead lifetime. These two additives have the common characteristics of: (1) $pK_a$ greater than about 8.5; and (2) $d(pK_a)/dT$ of −0.025 or lower. Notably, all other additives tested did not have these two characteristics and did now show the same improvement in printhead lifetime. For example, boric acid has a $pK_a$ of 9.24 but a $d(pK_a)/dT$ of only −0.008, and performed somewhat worse than the baseline ink (Ink 1). These initial observations were broadly in line with the inventors' hypothesis that localized lowering of pH in the nozzle chamber at high temperature reduces the rate of metal oxide corrosion, thereby increasing printhead lifetime.

However, despite these encouraging improvements in the total number of droplet ejections using certain additives, cursory observations showed that print quality declined (albeit transiently in some instances) over the course of testing, even after relatively few droplet ejections. This reduction in print quality was believed to be due to kogation of heater elements with consequent droplet misdirection and/or reduction in droplet velocity.

Therefore, the inventors conducted further investigations of alternative additives fulfilling the characteristics of: $pK_a$>8.5 and $d(pK_a)/dT$<−0.025. Cyan inks (Inks 10-17) were formulated as described in Table 3 and adjusted to about pH 9.1. All inks were filtered (0.2 microns) prior to use and each ink contained 1 ppm aluminum ions present as aluminum nitrate nonahydrate.

TABLE 3

Cyan ink formulations (1)

| | Ink 10 | Ink 11 | Ink 12 | Ink 13 | Ink 14 | Ink 15 | Ink 16 | Ink 17 |
|---|---|---|---|---|---|---|---|---|
| Ethylene glycol | 9.5 | 9.5 | 9.5 | 9.5 | 9.5 | 9.5 | 9.5 | 9.5 |
| Triethylene glycol | 13 | 13 | 13 | 13 | 13 | 13 | 13 | 13 |

TABLE 3-continued

Cyan ink formulations (1)

| | Ink 10 | Ink 11 | Ink 12 | Ink 13 | Ink 14 | Ink 15 | Ink 16 | Ink 17 |
|---|---|---|---|---|---|---|---|---|
| Cyan pigment | 3.5 | 3.5 | 3.5 | 3.5 | 3.5 | 3.5 | 3.5 | 3.5 |
| Emulgen ™ 120[b]/Surfynol ® 104[c] (2:1) | 1.25 | 1.25 | 1.25 | 1.25 | 1.25 | 1.25 | 1.25 | 1.25 |
| Silface ™ SAG-KB[k] | 0.05 | 0.05 | 0.05 | 0.05 | 0.05 | 0.05 | 0.05 | 0.05 |
| Ammonium formate | | | | | | 0.019 | | |
| Ammonium acetate | | | | | | | 0.023 | |
| Ammonium nitrate | | | | | 0.024 | | | |
| Ethanolamine | | | | 0.018 | | | | |
| 2-Amino-2-methyl-1-propanol (AMP) | | 0.027 | 0.045 | | | | | 0.045 |
| 2-pyrrolidone-5-carboxylic acid[l] (2P5C) | | | | | | | | 0.052 |
| Water | balance | balance | balance | balance | balance | balance | balance | balance |

[k]Silface ™ SAG-002 is a rake-type mono-alkoxylated silicone surfactant, available from Nissin Chemical Industry Co., Ltd.
[l]2-pyrrolidone-5-carboxylic acid is a corrosion inhibitor described in JP2711888.

The cyan ink formulations (Inks 10-17) shown in Table 3 were tested for printhead lifetime using Method B described above, and the number of droplet ejections (reported as millions of ejections) before printhead failure was determined. Additionally, test prints were given a thin line misdirection (TLM) grading to judge print quality. The results from these printhead lifetime tests and print quality analyses are shown in Table 4.

TABLE 4

Printhead lifetime and print quality testing for cyan inks (1)

| Tested Ink | Additive | Additive Concentration | $pK_a$ | $d(pK_a)/dT$ | Printhead Lifetime (Method B) | TLM Grading |
|---|---|---|---|---|---|---|
| Ink 10 | None | 0 | | | 900 | 8 |
| Ink 11 | AMP | 3 mM | 9.69 | −0.032 | 1700 | 4 |
| Ink 12 | AMP | 5 mM | 9.69 | −0.032 | 4500 | 5 |
| Ink 13 | Ethanolamine | 3 mM | 9.5 | −0.030 | 1950 | 4 |
| Ink 14 | Ammonium nitrate | 3 mM | 9.25 | −0.031 | 5800 | 7 |
| Ink 15 | Ammonium formate | 3 mM | 9.25 | −0.031 | 6300 | 6 |
| Ink 16 | Ammonium acetate | 3 mM | 9.25 | −0.031 | 6800 | 3 |
| Ink 17 | AMP/2P5C | 5 mM/4 mM | 9.69 | −0.032 | 2000 | 3 |

Inks 11-17 all shared the common characteristics of $pK_a > 8.5$ and $d(pK_a)/dT < -0.025$, and all showed significant improvement in printhead lifetime over the baseline ink (Ink 10). Inks containing ammonium ions (Inks 14-16) were generally the most effective in improving printhead lifetime compared to inks containing other nitrogen-containing compounds (Inks 11-13 and 14). Of the ammonium salts tested, ammonium formate (Ink 14) and ammonium nitrate (Ink 15) gave superior print quality compared to ammonium acetate (Ink 16), as judged by the TLM grading. Overall, ammonium formate (Ink 14) had the best balance of printhead lifetime improvement and print quality. Furthermore, ammonium formate was preferred due to potential safety issues associated with handling bulk quantities of ammonium nitrate during large-scale ink production.

Cyan inks (Inks 18-23) containing varying amounts of ammonium formate were formulated as described in Table 5 and adjusted to about pH 9.1. All inks were filtered (0.2 microns) prior to use and each ink contained 1 ppm aluminum ions present as aluminum nitrate nonahydrate.

TABLE 5

Cyan ink formulations (2)

| | Ink 18 | Ink 19 | Ink 20 | Ink 21 | Ink 22 | Ink 23 |
|---|---|---|---|---|---|---|
| Ethylene glycol | 9.5 | 9.5 | 9.5 | 9.5 | 9.5 | 9.5 |
| Liponic ® EG-1[a] | 5 | 5 | 5 | 5 | 5 | 5 |
| Cyan pigment | 3.5 | 3.5 | 3.5 | 3.5 | 3.5 | 3.5 |
| Emulgen ™ 120[b]/Surfynol ® 104[c] (2:1) | 1.25 | 1.25 | 1.25 | 1.25 | 1.25 | 1.25 |
| Silface ™ SAG-KB[k] | 0.05 | 0.05 | 0.05 | 0.05 | 0.05 | 0.05 |
| Ammonium formate | | 0.0028 | 0.0063 | 0.013 | 0.019 | 0.031 |
| Water | balance | balance | balance | balance | | |

Cyan Inks 18-23 were subjected to printhead lifetime and print quality testing, as described above, and the results are shown in Table 6.

TABLE 6

Printhead lifetime and print quality testing for cyan inks (2)

| Tested Ink | Additive | Additive Concentration | Amount of ammonium ions | Printhead Lifetime (Method B) | TLM Grading |
|---|---|---|---|---|---|
| Ink 18 | None | 0 | | 800 | 10 |
| Ink 19 | Ammonium formate | 0.44 mM | 8 ppm | 1000 | 9.5 |
| Ink 20 | Ammonium formate | 1 mM | 18 ppm | 1400 | 9 |
| Ink 21 | Ammonium formate | 2 mM | 36 ppm | 2300 | 7 |
| Ink 22 | Ammonium formate | 3 mM | 54 ppm | 3200 | 6 |
| Ink 23 | Ammonium formate | 5 mM | 90 ppm | 6700 | 5 |

Inks 19-23 all showed significant improvement in printhead lifetime over the baseline ink (Ink 18). Even with only 18 ppm of ammonium ions (Ink 20), a 75% increase in printhead lifetime over the baseline was observed and at 8 ppm of ammonium ions (Ink 19) an appreciable improvement in printhead lifetime was still observed. Increasing the amount of ammonium ions (Inks 21-23) provided a corresponding increase in printhead lifetime. However, there was a clear trade-off in print quality with the TLM grading decreasing from 9 (Ink 20) to 5 (Ink 23) as the amount of ammonium ions was increased. Above a loading of 90 ppm ammonium ions, inks exhibited unacceptably low print quality, as judged by their TLM grading.

Similar improvements in printhead lifetime were observed when ammonium formate was substituted with ammonium nitrate in various ink formulations. The concentration of ammonium nitrate was optimally in the range of about 40 to 120 ppm (equivalent to 9 to 27 ppm ammonium ions), depending on ink color and ink vehicle components.

In general, ink formulations containing ethoxylated glycerol (Liponic® EG-1) had superior print quality, as judged by TLM grading, compared to ink formulations in which ethoxylated glycerol is absent. This was presumably due to the anti-kogative effects of ethoxylated glycerol. Typically, ethoxylated glycerol was effective in improving print quality when present at 5 wt. %, albeit with a small trade-off in printhead lifetimes. At lower concentrations, ethoxylated glycerol was somewhat less effective in improving print quality, although printhead lifetimes were somewhat improved compared to higher concentrations.

From the foregoing, it will therefore be appreciated that the present invention provides inks, printing systems, methods and ink sets for improving printhead lifetime. Ammonium ions were found to be most effective in improving printhead lifetime at very low concentrations with minimal loss of print quality. However, other nitrogen-containing compounds fulfilling the requisite characteristics were also effective, albeit with a greater impact on print quality.

It will, of course, be appreciated that the present invention has been described by way of example only and that modifications of detail may be made within the scope of the invention, which is defined in the accompanying claims.

The invention claimed is:

1. An aqueous-based inkjet ink for a thermal inkjet printhead comprising:
   a pigment;
   2 to 90 ppm ammonium ions; and
   an ink vehicle,
   wherein the ink has a pH in the range of 8 to 9.5.

2. The inkjet ink of claim 1, wherein the ammonium ions are present as one or more ammonium salts selected from the group consisting of: ammonium formate, ammonium acetate, ammonium nitrate, ammonium carbonate, ammonium hydrogen carbonate, ammonium hydroxide, ammonium hexafluorophosphate, ammonium carbamate, ammonium tetrafluoroborate, ammonium perchlorate, ammonium trifluoroacetate, ammonium trifluoromethanesulfonate, tri-ammonium phosphate, ammonium sulfide, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium oxalate, ammonium hydrogen oxalate, ammonium fluoride, ammonium chloride, ammonium bromide, ammonium iodide and ammonium sulfate.

3. The inkjet ink of claim 1, wherein the ammonium ions are present as ammonium formate or ammonium nitrate.

4. The inkjet ink of claim 1 further comprising from 0.1 to 10 ppm of a trivalent metal ion.

5. The inkjet ink of claim 4, wherein the trivalent metal ion is selected from the group consisting of: $Al^{3+}$ and $Ga^{3+}$.

6. The inkjet ink of claim 1, wherein the ink vehicle comprises at least one anti-kogation additive for minimizing kogation of the pigment.

7. The inkjet ink of claim 6, wherein the anti-kogation additive is selected from the group consisting of: 1 to 10 wt. % ethoxylated glycerol; 1 to 10 wt. % polyethylene glycol; 1 to 10 wt. % polyethylene glycol ethers; and 2 to 20 wt. % triethylene glycol.

8. The inkjet ink of claim 1, wherein the ink contains from 5 to 60 ppm ammonium ions.

9. An inkjet printing system comprising:
   a printhead comprising a plurality of inkjet nozzle devices, each nozzle device comprising: a nozzle chamber and a heater element disposed on a subjacent silicon oxide pedestal; and
   an aqueous-based inkjet ink contained in the nozzle chamber, the inkjet ink comprising a pigment; 2 to 90 ppm ammonium ions; and an ink vehicle,
   wherein the ink has a pH in the range of 8 to 9.5.

10. The system of claim 9, wherein the heater element has a protective coating comprising at least one metal oxide layer.

11. The system of claim 10, wherein the protective coating has a thickness in the range of 5 to 50 nm.

12. The system of claim 11, wherein the protective coating comprises a layer of tantalum oxide.

13. The system of claim 9, wherein the heater element is comprised of an alumnide alloy.

14. The system of claim 9, wherein the nozzle chamber is comprised of silicon oxide.

15. A method of printing from a thermal inkjet printhead, said printhead comprising a plurality of inkjet nozzle devices, each nozzle device comprising a nozzle chamber and a heater element disposed on a subjacent silicon oxide pedestal, said method comprising the steps of:
   supplying an aqueous-based inkjet ink from an ink reservoir to the nozzle chamber; and
   actuating the heater element so as to eject ink droplets from the nozzle chamber,
   wherein the ink comprises a pigment, 2 to 90 ppm ammonium ions and an ink vehicle, the ink having a pH in the range of 8 to 9.5.

16. The method of claim 15, wherein a pH of ink contained in the ink reservoir is higher than a pH of ink contained in the nozzle chamber during actuation of the heater element.

17. An ink set for an inkjet printer having one or more printheads, each ink in the ink set having an associated printhead lifetime, wherein: a first ink contains a first pigment and 2 to 90 ppm ammonium ions; and a second ink contains a second pigment and a lower amount of ammonium ions than the first ink, and wherein:
   the first and second inks each have a pH in the range of 8 to 9.5; and
   the first and second inks each have an associated printhead lifetime of greater than a minimum threshold number of ejections.

18. The ink set of claim 17, wherein the second ink is absent any ammonium ions.

19. The ink set of claim 17, wherein the minimum threshold number of ejections is in the range of 2 to 8 billion.

20. The ink set of claim 17, wherein the first ink, when absent the ammonium ions, has an associated printhead lifetime of less than the minimum threshold number of ejections.

* * * * *